3,119,804
PROCESS FOR POLYMERIZING ETHYLENE IN THE PRESENCE OF ABOUT 0.25 PERCENT BUTANE
Earl V. Harlow, Pittsburgh, Pa., assignor to Koppers Company, Inc., a corporation of Delaware
No Drawing. Filed June 21, 1962, Ser. No. 204,069
1 Claim. (Cl. 260—94.9)

This application is a continuation-in-part of my copending application Serial No. 846,068, filed October 13, 1959, and now abandoned.

This invention relates generally to a process for the manufacture of solid polyethylene by the catalytic polymerization of ethylene at relatively high temperatures and pressures, and more particularly to the prevention of the accumulation of high molecular weight polymer on the walls of the polymerization reactor under these conditions.

High pressure polymerization is meant to describe conditions wherein the pressure is from about 15,000 to 50,000 pounds per square inch, and the temperature is from about 140° C. to about 300° C. High pressure polymerization is generally conducted in the presence of small amounts of free radical yielding catalysts, or as they are sometimes referred to, initiators, e.g., oxygen or peroxides such as benzoyl peroxide and di-t-butylperoxide; the amount of oxygen used, for example, being about 15 to 50 parts per million parts of ethylene.

When the polymerization is carried out in a tubular reactor the ethylene polymerizes into a solid polymer as it passes through a tube which has a relatively great length in comparison to its cross-sectional dimensions. Any unreacted ethylene gas, together with the polyethylene which forms, is removed from the discharge end of the reactor. The unreacted ethylene gas is separated from the polyethylene in catch pots and is generally recirculated through the reactor.

The ethylene, along with the catalyst, is fed into the inlet end of the reactor and is gradually heated as it flows through the reactor until polymerization at a detectable rate is initiated. The temperature at which this occurs is characteristic of the initiator and in the case of oxygen it is about 165–170° C. The polymerization of ethylene is a highly exothermic reaction, about 1500 B.t.u.'s being released per pound of ethylene polymerized to polyethylene. There is danger of explosion and decomposition of the ethylene at temperatures about 300° C. Therefore, rapid removal of this large amount of heat is necessary to insure that this temperature is not far exceeded.

At the inlet end of the reactor heat is added to the polymerization system, while toward the outlet end of the reactor the heat of reaction is removed by surrounding the reactor tube with a jacket in which hot water is circulated. The effectiveness of this method of removing the heat of reaction is limited in that cooling water cannot be maintained at a low temperature because the low temperatures increase the viscosity of the polymer that forms along the walls of the reactor tubes, and makes it difficult to flow the polyethylene to the discharge end of the reactor. A portion of the heat of reaction is removed by the circulating water but the remainder must be removed as sensible heat from the effluent stream of unreacted ethylene and polymer. The location of this peak temperature in the reactor is known as the "hot spot" and as pointed out above cannot substantially exceed 300° C.

It is known that a reduction in polymerization temperature of an increase in polymerization pressure produces a polymer having fewer branches and greater density and stiffness than one produced at higher temperatures or lower pressures. Additionally, a reduced temperature or increased pressure results in a polymer of higher molecular weight, which generally results in a decreased processability. One method of measuring the processability of the polymer is to measure the melt index by a standard test such as ASTM D1238–52T. Generally, the lower the melt index the higher the molecular weight.

Molecular weight may also be influenced by catalyst concentration; the more catalyst being present the lower the molecular weight of the polymer formed.

If an attempt is made to control molecular weight by varying the amount of catalyst used, then the temperature and pressure cannot be controlled independently, since the heat of polymerization is only partially removed by transfer through the walls of the reactor tube into the cooling water. Therefore, if a high catalyst concentration is used to give a polymer of low molecular weight, then the peak temperature is increased. As has been mentioned above, the temperature must be kept below about 300° C. In order to do this, the pressure of the reaction would have to be decreased. This decreased pressure, of course, would tend to give a polymer of a branched nature and lower density and stiffness.

It is necessary to control the molecular weight in order to obtain a desired processability. As stated hereinabove, the processability can be measured in terms of the melt index. In one instance, for example, large amounts of polyethylene are used to cover wire and cable. The most useful grade for this application is polyethylene having a melt index of between 0.2 and 0.5. This grade of polyethylene has been found to be able to withstand environmental cracking and abrasion better than any of the other grades.

In order to produce material having this low melt index (from 0.2 to 0.5), a low operating temperature and a high pressure would be desirable. However, as has been pointed out above, there is a maximum temperature at which operation can proceed because the reaction rate will otherwise become excessive and the temperature cannot then be controlled. There is also a maximum pressure at which the reaction can proceed, which is dictated by the equipment's ability to withstand high pressure.

When an attempt is made to make polyethylene with a melt index of less than 0.5 at pressures of about 22,000 p.s.i. and temperatures of less than 300° C. a very hard, high molecular weight polymer forms in that segment of the reactor between the point of incipient polymerization e.g. about 165–170° C. when oxygen is used as the catalyst and the point where the temperature reaches about 200° C. This hard polymer acts as insulation and prevents efficient transfer of heat through the reactor walls to the circulating water. This retards the rise in temperature of gas, thereby permitting the formation of additional high molecular weight polymer which then deposits downstream of the previous deposits. This process is repeated, causing a migration of the entire reaction system toward the outlet end of the reactor.

Attempts have been made to prevent this high molecular weight polymer from forming on the reactor walls by periodically opening and closing a valve on the outlet end of the reactor so that an intermittent high velocity flow is obtained. It was believed that this high velocity flow would tear away any polymer deposited on the wall of the reactor, but this method has not been successful because complete removal of the deposited polymer in this manner is not possible.

It has now been found that the build-up of this high molecular weight polymer may be prevented if there is added to the feed ethylene a minor amount of butane.

In order to illustrate the process of this invention the following comparison test was run.

The polymerization reaction was initiated by feeding ethylene at a pressure of 22,500 p.s.i. and a temperature of 50° C. together with oxygen in an amount of 20 parts per million parts of ethylene into a commercial reactor consisting of 18 tubes having an inside diameter of 33 mm. The reactor was operated by periodically opening and closing a letdown valve located at the discharge end. The polymer produced under these conditions had a melt index of 0.14. An attempt to raise this melt index by increasing the amount of oxygen added was made and proved to be unsuccessful in that the temperature began to increase, approaching the danger point. Additionally, the hot point of the reactor began a migration toward the outlet end. This temperature migration is apparent upon an examination of Table I below. Table I does not set forth the conditions in the first seven tubes since these tubes are merely used for preheating the reaction mixture.

Examination of this table shows that there was no temperature migration and a steady state of operation was obtained in three hours. After several days operation the reaction was shut down and the reactor tubes examined. There was no indication of any of the high molecular weight polymer.

The above conclusively demonstrates the effectiveness of the present invention in preventing the undesirable build-up of high molecular weight polymer in the reactor, using high temperatures and pressures.

I claim:

In a process for polymerizing ethylene at pressures of 15,000 to 50,000 pounds per square inch, at temperatures from 140 to 300° C., and in the presence of an oxygen

TABLE I
*Tube Outlet Temperatures—° C., for an Eight-Hour Period—Without Chain Transfer Agent*

| Time | Reactor Inlet | Tube Number | | | | | | | | | | | | |
|---|---|---|---|---|---|---|---|---|---|---|---|---|---|---|
| | | 8 | 9 | 10 | 11 | 12 | 13 | 14 | 15 | 16 | 17 | 18 | CP | M.I. |
| 11:00 a.m. | App. 50° C. | 208 | 236 | 248 | 243 | 271 | 286 | 268 | 236 | 261 | 241 | 253 | 231 | 0.83 |
| 1:00 p.m. | | 201 | 232 | 242 | 241 | 267 | 289 | 270 | 281 | 281 | 263 | 267 | 247 | 0.14 |
| 3:00 p.m. | | 209 | 330 | 240 | 228 | 266 | 290 | 266 | 268 | 277 | 256 | 267 | 244 | 0.14 |
| 5:00 p.m. | | 178 | 192 | 210 | 213 | 246 | 278 | 276 | 254 | 298 | 280 | 280 | 257 | 0.10 |
| 7:00 p.m. | | 160 | 171 | 202 | 210 | 234 | 267 | 250 | 263 | 295 | 277 | 284 | 260 | 0.13 |

It became apparent that a steady state of operation could not be effected without exceeding the maximum temperature and the reactor was shut down. The reactor tubes were removed and examined and were found to contain a very high molecular weight polymer deposited on the walls thereof in appreciable quantities.

The above operation was repeated, except that in addition to other reactants, an excess of butane (about 0.5 weight percent) was added. An excess was used at the beginning of the reaction so that none of the excessively low melt-index material would be made. When it was apparent that the operation was proceeding in a desirable manner, the amount of butane was reduced to 0.25 weight percent based on the ethylene. The temperatures are reported in Table II below.

containing catalyst to produce a polymer having a low melt index of from 0.2 to 0.5, said process being characterized by the omission of other substances and being further characterized by a hard, high-molecular-weight polymer that forms in the segment of the reactor near the point of incipient polymerization, which polymer acts as a heat insulator whereby the transfer of heat through the reactor walls is decreased so that the high-molecular-weight polymer forms at a location which migrates downstream through the reactor, the improvement for preventing the formation of this hard, high-molecular-weight polymer while producing said polymer having a low melt index of from 0.2 to 0.5 which comprises adding about 0.25% by weight of butane to said ethylene prior to the polymerization of the ethylene.

TABLE II
*Tube Outlet Temperatures—° C., for an Eight-Hour Period—With Chain Transfer Agent*

| Time | Reactor Inlet | Tube Number | | | | | | | | | | | | |
|---|---|---|---|---|---|---|---|---|---|---|---|---|---|---|
| | | 8 | 9 | 10 | 11 | 12 | 13 | 14 | 15 | 16 | 17 | 18 | CP | M.I. |
| 11:00 a.m. | App. 50° C. | 220 | 264 | 274 | Thermocouple Broken. | 270 | 285 | 258 | 247 | 274 | 263 | 255 | 242 | .23 |
| 1:00 p.m. | | 224 | 263 | 278 | | 269 | 286 | 264 | 241 | 273 | 262 | 254 | 241 | .24 |
| 3:00 p.m. | | 246 | 263 | 276 | | 268 | 286 | 270 | 250 | 274 | 264 | 254 | 241 | .30 |
| 5:00 p.m. | | 241 | 260 | 278 | | 269 | 286 | 262 | 258 | 275 | 264 | 255 | 241 | .28 |
| 5:00 p.m. | | 218 | 259 | 276 | | 267 | 286 | 270 | 252 | 276 | 265 | 256 | 242 | .23 |

References Cited in the file of this patent

UNITED STATES PATENTS 2,921,059    Guillet et al.    Jan. 12, 1960